US006967949B2

(12) United States Patent
Davis et al.

(10) Patent No.: US 6,967,949 B2
(45) Date of Patent: Nov. 22, 2005

(54) METHOD AND APPARATUS FOR FORWARDING PACKETS IN AN ETHERNET PASSIVE OPTICAL NETWORK

(75) Inventors: Lawrence D. Davis, Petaluma, CA (US); Edward W. Boyd, Petaluma, CA (US); Glen Kramer, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 0 days.

(21) Appl. No.: 10/925,175

(22) Filed: Aug. 23, 2004

(65) Prior Publication Data

US 2005/0058118 A1    Mar. 17, 2005

Related U.S. Application Data

(60) Provisional application No. 60/570,928, filed on May 13, 2004, provisional application No. 60/566,517, filed on Apr. 28, 2004, provisional application No. 60/502,412, filed on Sep. 15, 2003.

(51) Int. Cl.⁷ .............................................. H04L 12/56
(52) U.S. Cl. ...................... 370/390; 370/389; 370/392; 370/409
(58) Field of Search ........................................ 370/390

(56) References Cited

U.S. PATENT DOCUMENTS

| | | | |
|---|---|---|---|
| 2003/0117998 A1 * | 6/2003 | Sala et al. ................... | 370/351 |
| 2003/0190168 A1 * | 10/2003 | Song et al. .................. | 398/168 |
| 2003/0235205 A1 * | 12/2003 | Song et al. .................. | 370/466 |
| 2004/0057431 A1 * | 3/2004 | Song et al. .................. | 370/390 |
| 2004/0114592 A1 * | 6/2004 | Kang et al. .................. | 370/389 |
| 2004/0120315 A1 * | 6/2004 | Han et al. .................... | 370/389 |
| 2004/0120326 A1 * | 6/2004 | Yoon et al. ............. | 370/395.53 |

OTHER PUBLICATIONS

Kramer et al., "Ethernet Passive Optical Network (EPON): Building a Next-Generation Optical Access Network", IEEE Communications Magazine, Feb. 2002, pp. 66-73.*
"EPON P Emulation and Downsteam Broadcast Baseline Proposal", by Hiroshi Suzuki et el., IEEE802.3 EFM Task Force, Mar. 2002.
"EPON Compliance Architecture", XP-002238653, Jan. 2002, IEEE802.3ah : Ethernet in the First Mile Task Force, Mar. 2002.

* cited by examiner

*Primary Examiner*—Dang Ton
*Assistant Examiner*—Michael J. Moore
(74) *Attorney, Agent, or Firm*—Park, Vaughan & Fleming LLP

(57) ABSTRACT

One embodiment of the present invention provides a system that facilitates forwarding of packets in an Ethernet passive optical network (EPON), which includes a central node and at least one remote node. During operation, the system assigns a logical link identifier (LLID) to a remote node, wherein an LLID corresponds to a logical link between the central node and a remote node. The system also associates an LLID with a port of a switch within the central node, wherein the switch has a number of ports; wherein a port may be a physical port or a virtual port; and wherein the number of ports on the switch are divided into network-side ports and user-side ports. Upon receiving a downstream packet from a network-side port, the system searches a mapping table to determine whether one or more field values of the downstream packet correspond to any LLIDs or ports. If the one or more field values correspond to an LLID, the system assigns the LLID to the downstream packet and transmits the downstream packet to a remote node.

50 Claims, 13 Drawing Sheets

METHOD AND APPARATUS FOR FORWARDING PACKETS IN AN ETHERNET PASSIVE OPTICAL NETWORK

RELATED APPLICATION

This application hereby claims priority under 35 U.S.C. §119 to the following provisional patent applications: U.S. Provisional Patent Application No. 60/502,412 filed on 15 Sep. 2003, entitled "Method for VLAN Translation in Ethernet Point-to-multipoint Network," by inventors Lawrence Drew Davis, Edward Wayne Boyd, and Glen Kramer; U.S. Provisional Patent Application No. 60/566,517 filed on 28 Apr. 2004, entitled "Method for VLAN Mapping to Support Triple-play Services in Ethernet Passive Optical Networks," by inventor Edward Wayne Boyd; and U.S. Provisional Patent Application No. 60/570,928 filed on 13 May 2004, entitled "Method for Service Differentiation in EPON Using ONU-Based Data Classification," by inventor Edward Wayne Boyd.

BACKGROUND

1. Field of the Invention

The present invention relates to the design of Ethernet passive optical networks. More specifically, the present invention relates to a method and apparatus for forwarding packets in an Ethernet passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically performed between an optical line terminal (OLT) and optical networks units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may use a number of cascaded optical splitters/couplers.) This configuration can significantly save the number of fibers and amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, downstream data frames are broadcast by the OLT to all ONUs and are selectively extracted by their destination ONUs. In the upstream direction, the ONUs need to share channel capacity and resources, because there is only one link coupling the passive optical coupler with the OLT.

To interoperate with other Ethernet equipment, an EPON needs to comply with the IEEE 802 standards, which specify two types of Ethernet operation: shared-medium operation and point-to-point operation. In a shared-medium Ethernet segment, all hosts are coupled to a single access domain over a common medium (e.g., a copper cable). Because the transmission medium is shared by all the hosts, only one host can transmit at a time while others are receiving. Point-to-point operation is proper when one link couples only two hosts. With a full-duplex point-to-point link, both hosts may transmit and receive simultaneously when communicating with each other.

An Ethernet bridge interconnects multiple Ethernet segments and forwards Ethernet frames among these segments. A bridge typically has a number of ports, each of which may be coupled to either a shared-medium segment or a point-to-point segment. According to the IEEE 802 standards, a bridge forwards a frame to a port associated with the frame's medium access control (MAC) destination address. A bridge does not forward a frame to a port on which it arrives. It is generally assumed that, if the frame's destination address is associated with the port on which the frame arrives, a frame's destination host is on the same shared-medium segment (called "broadcast domain") as the source host. This is because communication between hosts on the same broadcast domain usually can be performed without the help of the bridge.

A bridge maintains a MAC address-port mapping table by associating the MAC source address of a frame with the port it arrives on. When an arriving frame's MAC destination address does not correspond to any port (i.e., the bridge has not established a MAC address-port mapping relationship for this address), the bridge floods the frame to every port except for the one on which the frame arrives.

In an EPON, an OLT generally behaves like an Ethernet bridge. The tree topology of an EPON, however, presents a problem: if the head end (OLT side) of the upstream link is coupled to one single port of the bridge residing in the OLT, the bridge will not forward any frames sent by an ONU to another ONU. This is because the entire EPON, which couples to the bridge through one port, appears to be a single shared-medium segment to the bridge. Because of the one-way broadcast nature of an EPON, an ONU cannot receive signals sent by other ONUs, unless the signals are switched and re-transmitted downstream. Fortunately, one can solve this problem by creating a logical link between each ONU and the OLT, and creating a virtual port on the bridge corresponding to this logical link. In this way, each ONU has its own logical port on the bridge, and operates as if there is a point-to-point link between the ONU and the OLT (this is called point-to-point emulation, PtPE). An upstream frame from an ONU is assigned a logical link identifier (LLID) that identifies to which virtual port this frame should go.

Although PtPE solves the bridging issue, the default bridge behavior of an OLT still has limitations. For example, the default flooding of a frame with unknown MAC destination address is not desirable. This is because some of the virtual ports are coupled to an upstream external network, and some are coupled to downstream ONUs. Consequently, frames arriving from a network-side virtual port may be flooded back to other network-side virtual ports. Such behavior is generally not desired for privacy purposes. Another limitation is that an OLT does not process information outside the Ethernet header, thereby prohibiting implementation of more intelligent switching functions.

Hence, what is needed is a method and an apparatus for forwarding packets in an EPON which allows more intelligent packet processing than an Ethernet bridge does.

SUMMARY

One embodiment of the present invention provides a system that facilitates forwarding of packets in an Ethernet passive optical network (EPON), which includes a central node and at least one remote node. During operation, the system assigns a logical link identifier (LLID) to a remote node, wherein an LLID corresponds to a logical link between the central node and a remote node. The system also associates an LLID with a port of a switch within the central node, wherein the switch has a number of ports; wherein a port may be a physical port or a virtual port; and wherein the number of ports on the switch are divided into network-side ports and user-side ports. Upon receiving a downstream packet from a network-side port, the system searches a mapping table to determine whether one or more field values of the downstream packet correspond to any LLIDs or ports. If the one or more field values correspond to an LLID, the system assigns the LLID to the downstream packet and transmits the downstream packet to a remote node.

In a variation of this embodiment, the one or more field values of the downstream packet include a media-access control (MAC) destination address. If the MAC destination address does not correspond to an LLID or a network-side port, the system floods the downstream packet to all the user-side ports. If the MAC destination address corresponds to a network-side port, the system drops the downstream packet.

In a variation of this embodiment, the one or more field values of the downstream packet include a virtual local area network (VLAN) identifier.

In a further variation, the system drops the downstream packet if the downstream packet does not carry a VLAN identifier which corresponds to an LLID or a port.

In a further variation, if the downstream packet does not carry a VLAN identifier which corresponds to an LLID or a port, the system searches the mapping table to determine whether the MAC destination address of the downstream packet corresponds to an LLID or a port. If the MAC destination address corresponds to an LLID, the system assigns the LLID to the downstream packet and transmits the downstream packet to a remote node. If the MAC destination address does not correspond to an LLID or a network-side port based on the mapping table, the system floods the downstream packet to all the user-side ports. If the MAC destination address of the downstream packet corresponds to a network-side port, the system drops the downstream packet.

In a further variation, if the VLAN identifier of the downstream packet corresponds to a group of LLIDs, the system searches the mapping table to determine whether the MAC destination address of the downstream packet corresponds to an LLID. If the MAC destination address corresponds to an LLID which is among the group of LLIDs corresponding to the VLAN identifier, the system assigns the LLID to the downstream packet and transmits the downstream packet to a remote node.

In a further variation, assigning the LLID to the downstream packet involves tagging the downstream packet with the LLID while preserving the VLAN identifier of the downstream packet.

In a further variation, if the VLAN identifier of the downstream packet corresponds to an LLID, the system replaces the VLAN identifier with a local-significant VLAN identifier prior to transmitting the downstream packet to a remote node.

In a variation of this embodiment, the system receives an upstream packet from a user-side port and searches the mapping table to determine whether the MAC destination address of the upstream packet is associated with any network-side ports. If the MAC destination address of the upstream packet corresponds to a network-side port, the system transmits the upstream packet through that network-side port. If the MAC destination address of the upstream packet does not correspond to a network-side port or a user-side port, the system floods the upstream packet to all the network-side ports.

In a variation of this embodiment, the system receives an upstream packet from a user-side port and searches the mapping table to determine whether the LLID of the upstream packet corresponds to a VLAN identifier. If so, the system assigns the VLAN identifier to the upstream packet and transmits the upstream packet through a corresponding network-side port.

In a further variation, if the VLAN identifier also corresponds to a group of LLIDs and a number of network-side ports, the system searches the mapping table to determine whether the MAC destination address of the upstream packet corresponds to a network-side port which is among the number of network-side ports corresponding to the VLAN identifier. If so, the system transmits the upstream packet through that network-side port.

In a variation of this embodiment, the system receives an upstream packet from a user-side port. If the upstream packet carries a VLAN identifier that corresponds to a network-side port, the system selects the network-side port based on the VLAN identifier and transmits the upstream packet through the network-side port.

In a further variation, the system drops the upstream packet if the upstream packet does not carry a VLAN identifier that corresponds to a port.

In a further variation, if the upstream packet does not carry a VLAN identifier which corresponds to a port, the system searches the mapping table to determine whether the MAC destination address corresponds to a network-side port. If so, the system transmits the upstream packet to that network-side port.

In a further variation, if the upstream packet carries a VLAN identifier which corresponds to a network-side port, the system replaces the VLAN identifier of the upstream packet with a network-significant VLAN identifier.

In a variation of this embodiment, the system maintains knowledge at the central node of all active multicast groups within the EPON. If a remote node sends a message to join that multicast group of which no remote node is a member, the system sends a message from the central node to a multicast source to join a multicast group. The system also receives a multicast packet at the central node on behalf of a number of remote nodes which are members of a multicast group, and broadcasts the multicast packet from the central node to every remote node, thereby eliminating the need for transmitting a separate copy of the multicast packet to each remote node which is a member of the multicast group.

In a further variation, the system maintains knowledge at the central node of all the remote nodes which are members of any active multicast group. If a remote node sends a message to leave that multicast group of which that remote node is the only member within the EPON, the system sends a message from the central node to a multicast source to leave a multicast group.

In a further variation, if a remote node sends a message to the central node to leave a multicast group, the system broadcasts a query from the central node to all the remote nodes, thereby allowing the remote nodes to confirm membership for this multicast group. If the remote node that sends the leave message is the only member left in this multicast group within the EPON, the system sends a message from the central node to a multicast source to leave this multicast group.

In a variation of this embodiment, the system maintains knowledge at a remote node of all the active multicast groups to which the remote node belongs. If a user sends a message to the remote node to join that multicast group of which no user coupled to the remote node is a member, the system sends a message from the remote node to the central node to join a multicast group. The system also receives a multicast packet at the remote node on behalf of a number of users which are members of the corresponding multicast group, and forwards the multicast packet from the remote node to the users which are coupled to the remote node and which are members of the corresponding multicast group.

In a further variation, the system maintains knowledge at the remote node of all the users coupled to the remote node which are members of any active multicast group. If a user sends a message to the remote node to leave that multicast group of which that user is the only member coupled to the remote node, the system sends a message from the remote node to the central node to leave a multicast group.

In a further variation, if a user sends a message to the remote node to leave a multicast group, the system broadcasts a query from the remote node to all the users coupled to the remote node, thereby allowing the users to confirm membership for this multicast group. If the user that sends the leave message is the only user which belongs to this multicast group and which is coupled to the remote node, the system sends a message from the remote node to the central node to leave this multicast group.

In a variation of this embodiment, the system receives an upstream packet from a user at a remote node and detects the values of one or more fields of the upstream packet. The system buffers upstream packets in different queues based on the values of the one or more fields, thereby allowing different service qualities. The system then transmits the upstream packet to the central node.

In a further variation, while detecting the values of one or more fields of the upstream packet, the system specifies a header layer, an offset, and a length of a field.

In a further variation, the one or more fields are among: an IEEE 802.1p priority field, a VLAN identifier, a MAC destination address, an Internet Protocol (IP) Type of Service (TOS) field, a Multiple-Protocol Label Switching (MPLS) Class of Service (COS) field, an IP source address, an IP destination address, a Transmission Control Protocol (TCP) or User Datagram Protocol (UDP) source port number, and a TCP/UDP destination port number. The system then assigns an LLID to the upstream packet based on values of the one or more fields.

In a further variation, the system assigns an LLID to the upstream packet based on values of the one or more fields. While buffering the upstream packets in different queues, the system stores the packets in queues corresponding to the different LLIDs.

In a further variation, the system assigns an identical LLID to upstream packets whose values of the one or more fields differ. While buffering the upstream packets in different queues, the system stores the packets in queues based on the different values of the one or more fields.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
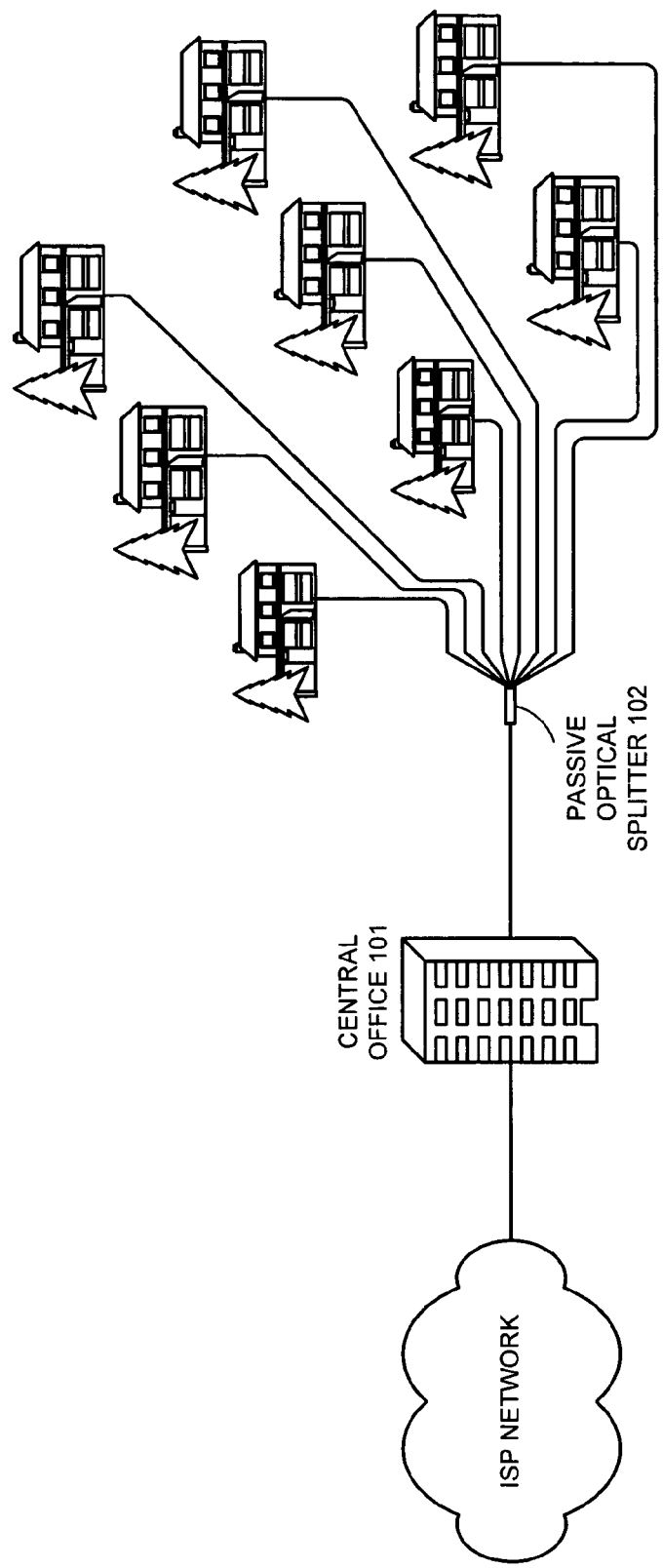
FIG. 1 illustrates an Ethernet passive optical network wherein a central office and a number of subscribers are coupled through optical fibers and an Ethernet passive optical splitter (prior art).

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode in EPON

Figure 2:
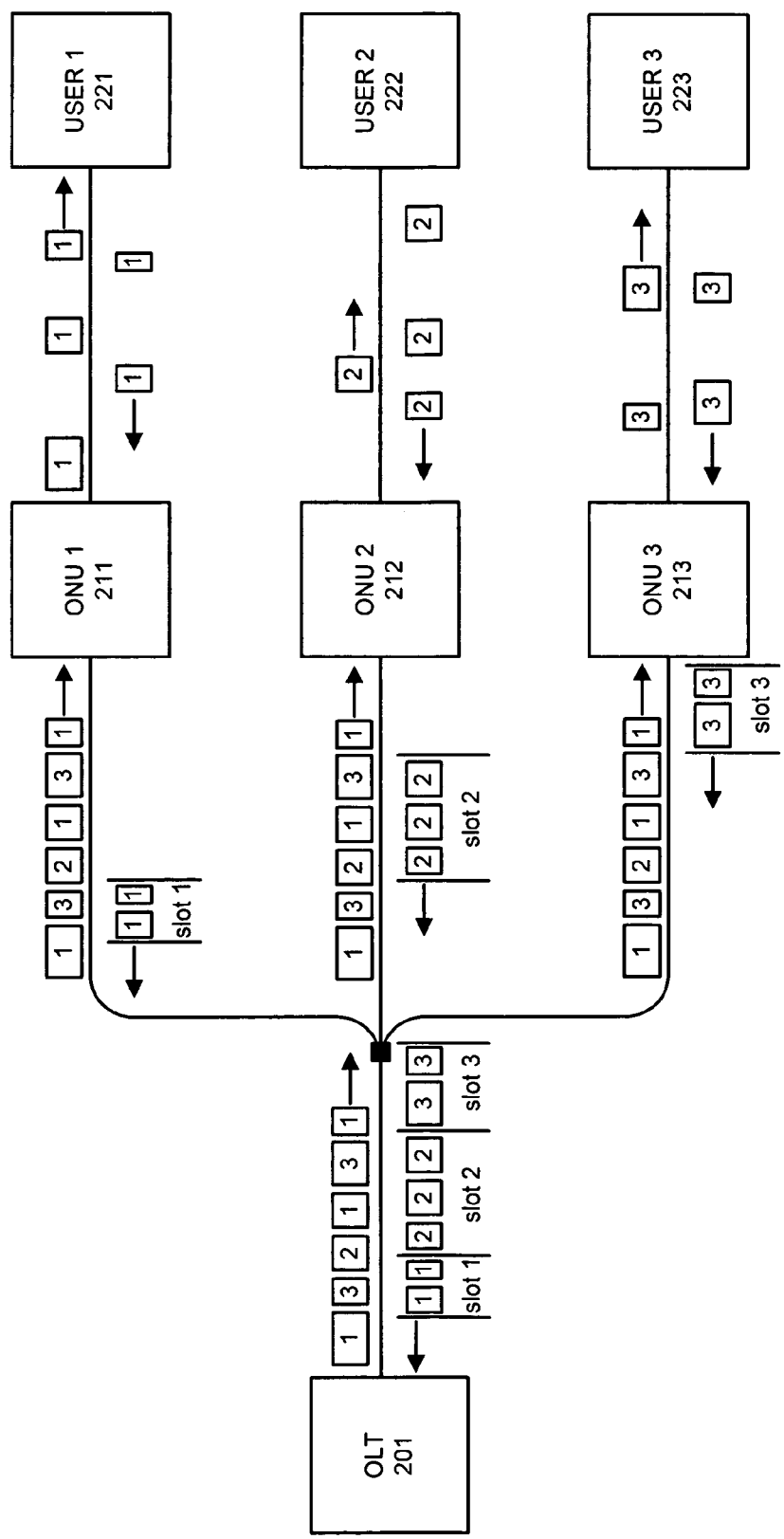
FIG. 2 illustrates an EPON in normal operation mode (prior art).

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode accommodates regular upstream data transmissions, where an OLT assigns transmission opportunities to all initialized ONUs.

As shown in FIG. 2, in the downstream direction, OLT 201 broadcasts downstream data to ONU 1 (211), ONU 2 (212), and ONU 3 (213). While all ONUs may receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission window.

Figure 3:
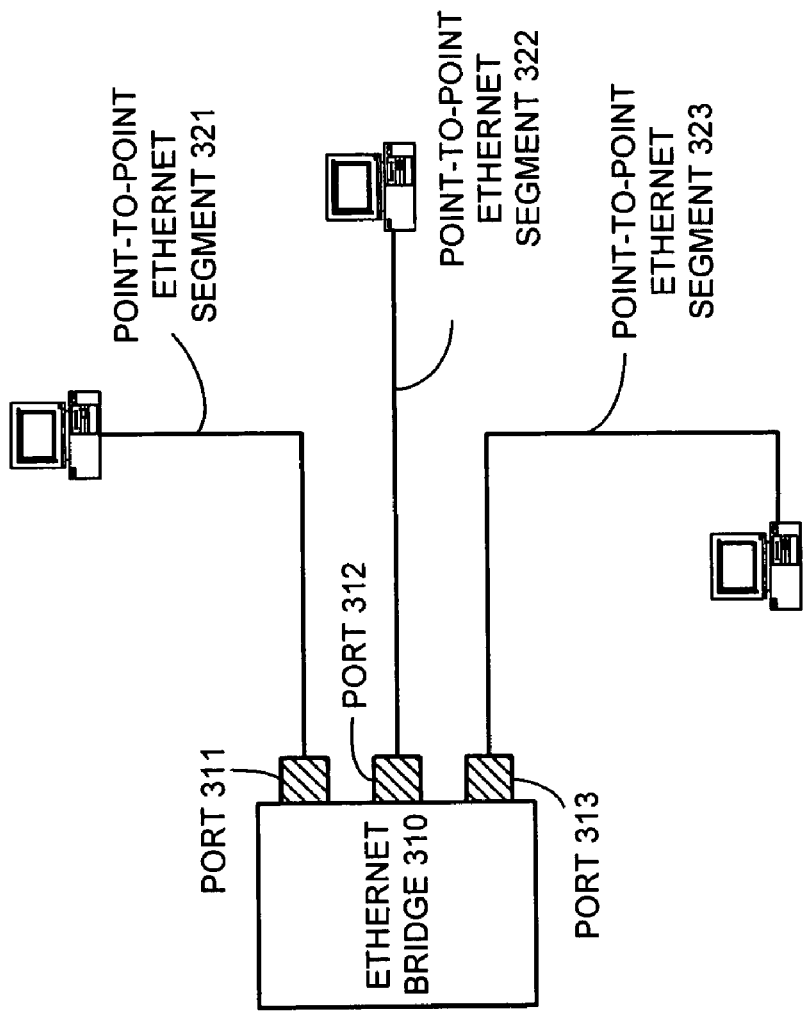
FIG. 3 illustrates bridged Ethernet segments (prior art).

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT), General Ethernet Requirement FIG. 3 illustrates bridged Ethernet segments (prior art). The IEEE 802 standards allow an Ethernet segment to operate in a point-to-point mode. In a point-to-point Ethernet segment, a link couples two hosts, or a host and an Ethernet bridge. Point-to-point mode is a common form of operation in a switched Ethernet, such as Gigabit Ethernet.

When multiple Ethernet hosts need to communicate with one another, an Ethernet bridge typically couples and switches between multiple point-to-point Ethernet segments to allow inter-segment communications. As shown in FIG. 3, Ethernet bridge 310 has multiple ports. Point-to-point segments 321, 322, and 323 are coupled to ports 311, 312, and 323, respectively. If the host on segment 322 sends a data frame to the host on segment 321, the data frame will be forwarded by Ethernet bridge 310 from port 312 to port 311 according to its destination Ethernet (MAC) address. Generally, a bridge does not forward a frame back to the port on which it arrives, because the segment coupled to that port is assumed to be a shared-medium segment, wherein the destination host can receive the frame without the frame being forwarded by the bridge.

Point-to-Point Emulation (PtPE) in EPON

In an EPON, because the upstream transmission from an ONU to the OLT is point-to-point communication, the operation of EPON ideally conforms to the point-to-point Ethernet operation as defined by the IEEE 802 standard. However, the EPON architecture does not automatically satisfy the requirement of bridged point-to-point Ethernet: if the EPON upstream link is coupled to one Ethernet bridge port, and all the upstream traffic is received at that port, users connected to different ONUs on the same EPON will be unable to communicate with one another. The Ethernet bridge located within the OLT will not switch among the upstream data, because they are received at the same port. Such a configuration forces data traffic among ONUs within the same EPON to be processed on layer 3 (network layer) and switched by equipment that resides outside the EPON (e.g., an IP router to which the OLT is connected). This is a very inefficient way of delivering intra-EPON traffic.

To resolve this problem, and to ensure seamless integration of an EPON with other Ethernet networks, devices attached to the EPON medium ideally have an additional sub-layer that can emulate a point-to-point medium. This sub-layer is referred to as Point-to-Point Emulation (PtPE) sub-layer. This emulation sub-layer resides below the MAC layer to preserve existing Ethernet MAC operation defined in the IEEE P802.3 standards. Operation of this emulation layer relies on tagging Ethernet frames with tags unique for each ONU. These tags are called logic link IDs (LLIDs) and are placed in the preamble before each frame.

Figure 4A:
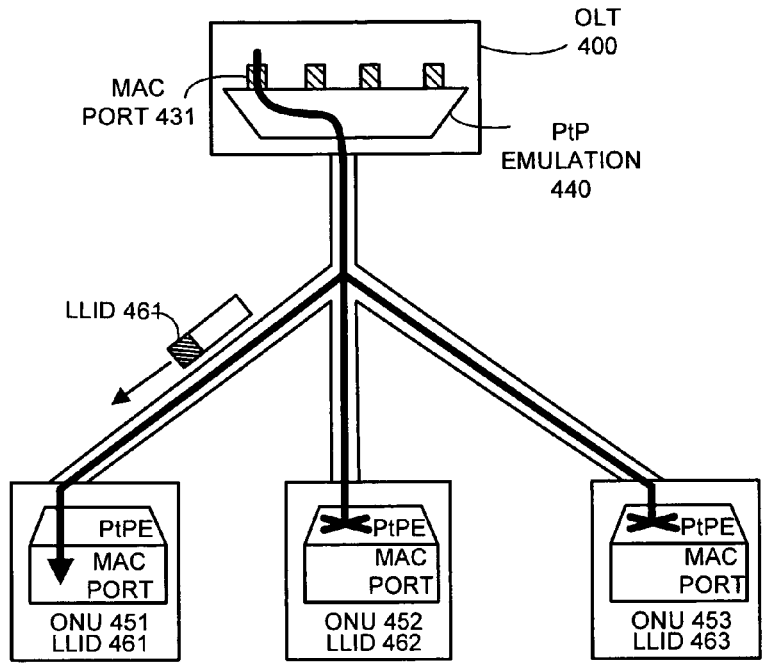
FIG. 4A illustrates transmission of downstream traffic with point-to-pint emulation in an EPON (prior art).

FIG. 4A illustrates transmission of downstream traffic with point-to-point emulation in an EPON (prior art). In PtPE mode, OLT 400 has multiple MAC ports (interfaces), each of which corresponds to an ONU. When sending an Ethernet frame downstream from MAC port 431, PtPE sub-layer 440 in OLT 400 inserts LLID 461 which is associated with MAC port 431. Although the frame is broadcast through the passive optical coupler to every ONU, only the PtPE sub-layer module located within an ONU with a matching LLID (ONU 451 with LLID 461 in this example) will accept the frame and pass it to its MAC layer for further verification. MAC layers in other ONUs (ONU 452 with LLID 462, and ONU 453 with LLID 463) will never receive that frame. Accordingly, it appears as if the frame was sent on a point-to-point link to only the destination ONU.

Figure 4B:
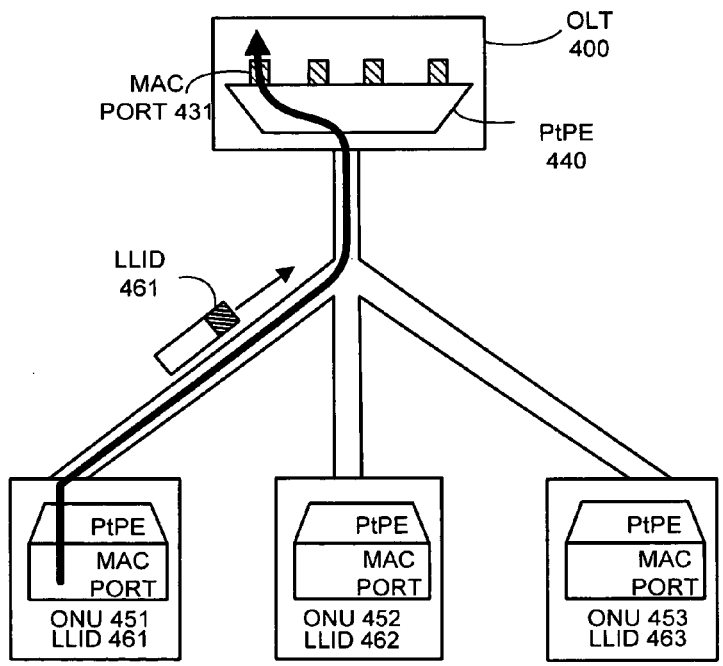
FIG. 4B illustrates transmission of upstream traffic with point-to-pint emulation in an EPON (prior art).

FIG. 4B illustrates transmission of upstream traffic with point-to-pint emulation in an EPON (prior art). In the upstream direction, ONU 451 inserts its assigned LLID 461 in the preamble of each transmitted frame. Accordingly, PtPE sub-layer 440 of OLT 400 disseminates the frame to MAC port 431.

Bridging in EPON

Figure 5:
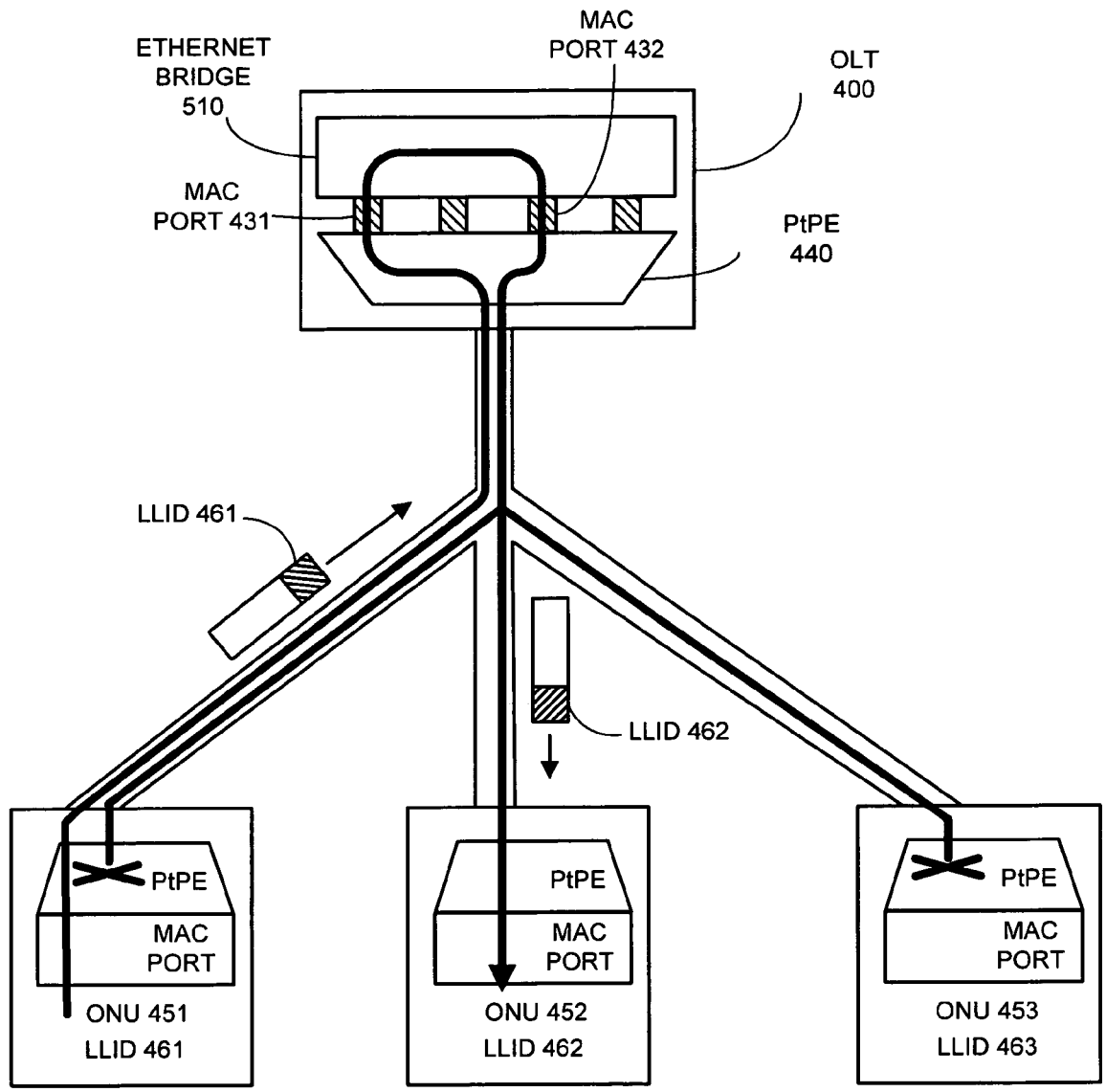
FIG. 5 illustrates bridging between ONUs with point-to-point emulation in an EPON (prior art).

FIG. 5 illustrates bridging between ONUs with point-to-point emulation in an EPON (prior art). In general, all frames transmitted (upstream and downstream) between OLT 400 and a given ONU always have the LLID assigned to the given ONU. Note that an LLID is only used to emulate a point-to-point link, not for switching or relaying frames. In this example, ONU 451 intends to send a frame to ONU 452. When the PtPE sub-layer 400 in OLT 400 receives this frame, it determines to which Ethernet-bridge port this frame should go, which in this example is MAC port 431 and which is associated with LLID 461. PtPE sub-layer 400 also removes the frame's LLID 461. Subsequently, Ethernet bridge 510 inspects the destination MAC address of the frame and determines to which port the frame should be switched, as regular Ethernet bridge would do. It then forwards the frame to the port associated with ONU 452. PtPE sub-layer 400 in turn attaches to the downstream frame LLID 462, which is associated with ONU 452. Based on LLID 462, PtPE sub-layer in ONU 452 accepts this frame and delivers the frame to ONU 452.

Virtual ONUs

Figure 6:
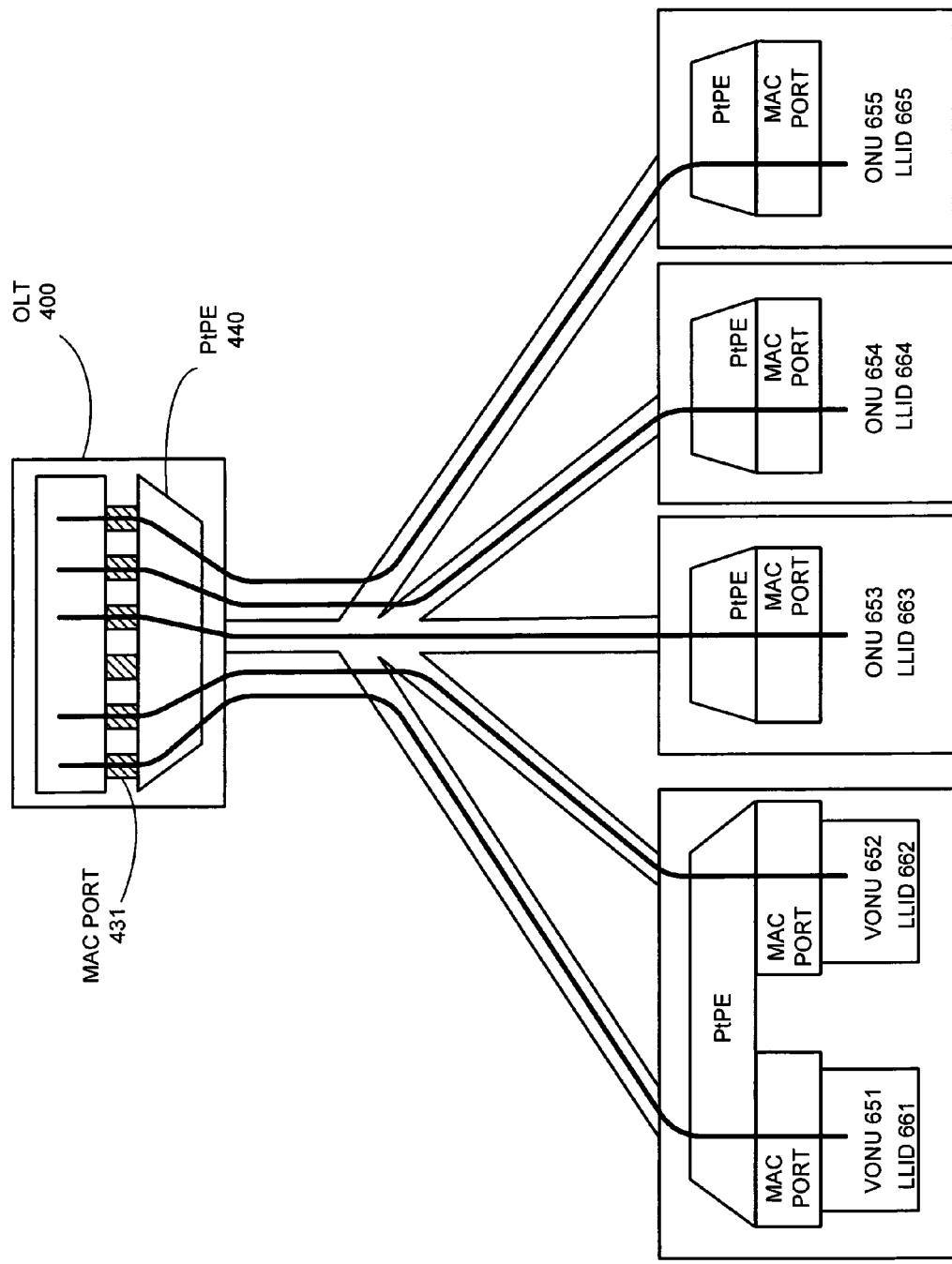
FIG. 6 illustrates virtual ONUs (VONUs) with logical links in an EPON (prior art).

FIG. 6 illustrates virtual ONUs (VONUs) with logical links in an EPON (prior art). One implementation of EPON may allow more than one LLID to be assigned to a physical ONU, wherein each LLID corresponds to an entity (e.g., a network device or an application) which needs a separate communication channel with the OLT. As shown in FIG. 6, a physical ONU 650 accommodates two virtual ONUs (VONUs) 651 and 652. VONU 651 and 652 have LLIDs 661 and 662, respectively. Correspondingly, ONU 650 has two MAC ports associated with VONU 651 and 652 respectively. In the same EPON, there may also exist separate physical ONUs, such as ONUs 653, 654, and 655 (with LLIDs 663, 664, and 665, respectively). During actual operation, OLT 400 does not distinguish VONUs from separate physical ONUs, and grants transmission slots to each VONU as if it was a separate physical ONU. For the reason stated above, the terms "VONU" and "ONU" are used interchangeably in the present invention.

Bridged Operation Mode of OLT

Figure 7:
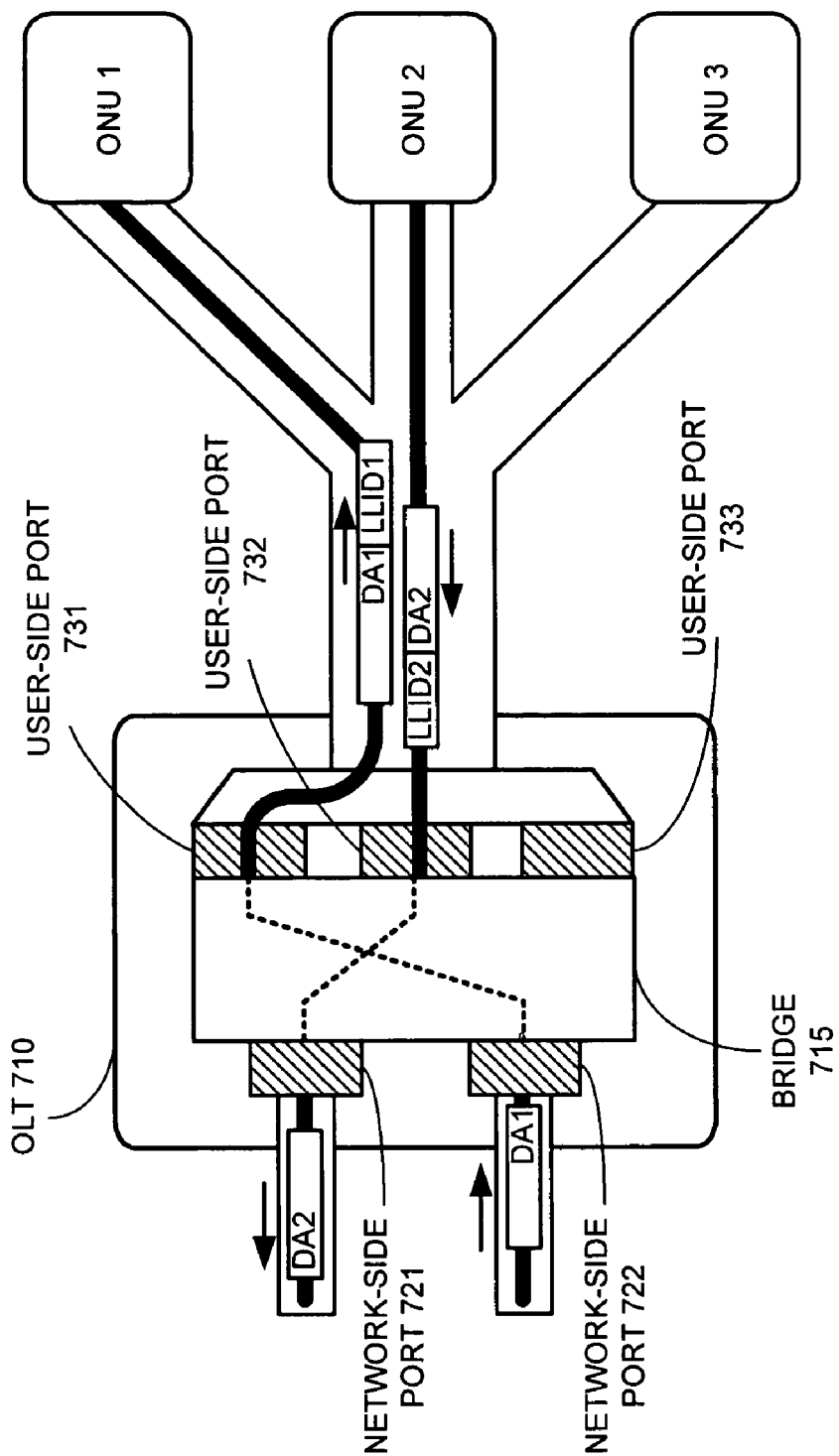
FIG. 7 illustrates bridged operation mode of an OLT in accordance with one embodiment of the present invention.

FIG. 7 illustrates bridged operation mode of an OLT in accordance with one embodiment of the present invention. A conventional bridge does not distinguish among its ports, and floods a packet to all the ports (except for the port on which it arrives) if it does not recognize the packet's MAC destination address. Such "blind" flooding is not desirable in access networks because it may send downstream packets from an external network back to the external network. One way to solve this problem is to segregate the ports into network-side ports and user-side ports. A packet arriving on a network-side port may be forwarded to one or more user-side ports, but may not be forwarded to a network-side port. Note that these ports can be virtual ports. The PtPE sub-layer is responsible for mapping an LLID to a virtual port.

As shown in FIG. 7, OLT 710 contains a bridge 715, which has a number of ports. Network-side ports 721 and 722 are coupled to external networks. User-side ports 731, 732, and 733 are coupled to ONU 1, ONU 2, and ONU 3, respectively. When a downstream packet with MAC destination address DA1 arrives on network-side port 722, bridge 715 searches a mapping table for an LLID that corresponds to DA1. Assuming that LLID1 corresponds to DA1, bridge 715 forwards the downstream packet to user-side port 731, and the PtPE sub-layer accordingly tags the downstream packet with LLID1. OLT 710 subsequently transmits the packet to the destined ONU (ONU1). If bridge 715 has learned (from previously forwarded packets) that DA1 is behind one of the network-side ports, it may discard the packet. If bridge 715 does not find an LLID that corresponds to DA1, it may flood that downstream packet to all the user-side ports.

When an upstream packet with MAC destination address DA2 and LLID 2 arrives on user-side port 732, bridge 715 searches a mapping table for a network-side port that corresponds to DA2. Assuming that network-side port 721 corresponds to DA2, bridge 715 forwards the upstream packet to network-side port 721. If bridge 715 does not find a network-side port that corresponds to DA2, it may flood that upstream packet to all network-side ports.

Dedicated-VLAN Operation Mode of OLT

Figure 8:
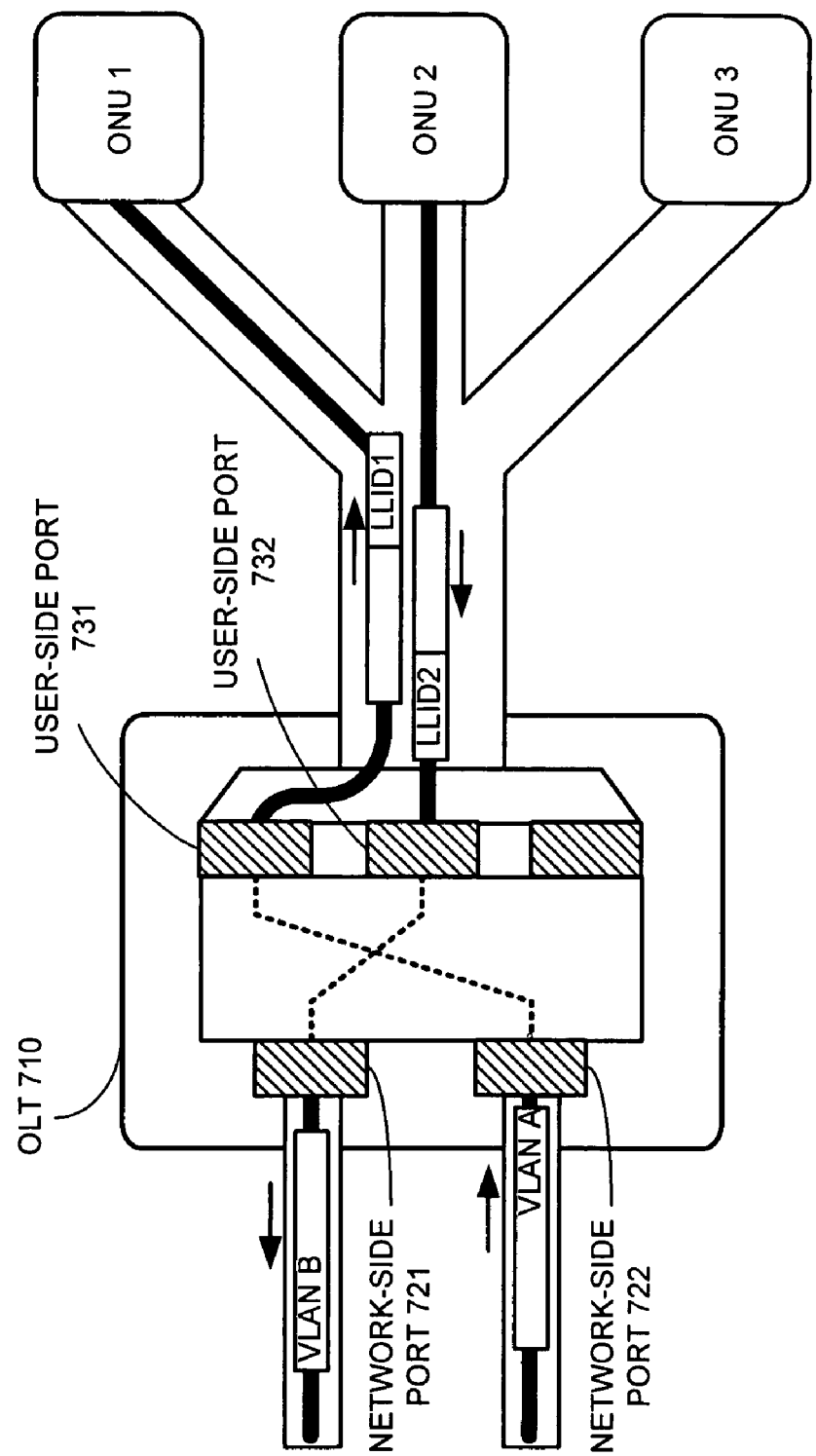
FIG. 8 illustrates dedicated-VLAN operation mode of an OLT in accordance with one embodiment of the present invention.

FIG. 8 illustrates dedicated-VLAN operation mode of an OLT in accordance with one embodiment of the present invention. In dedicated-VLAN mode, a unique VLAN tag (VLAN identifier) is associated with every LLID. When a tagged Ethernet packet arrives on a network-side port, the OLT uses the packet's VLAN tag value to select a user-side port and the corresponding LLID. The OLT may discard an untagged packet arriving on a network-side port. Alternatively, the OLT may use the packet's MAC destination address to search for the correct LLID, as an OLT would do in a bridged operation mode.

In the upstream direction, the OLT adds a VLAN tag to a packet arriving on a user-side port based on the packet's LLID. If the packet already has a VLAN tag, the OLT can replace this VLAN tag with the new VLAN tag. Alternatively, the OLT can append the new VLAN tag to the existing VLAN tag.

In the example illustrated in FIG. 8, a downstream packet with VLAN tag A arrives on network-side port 722. OLT 710 subsequently assigns LLID1 to the downstream packet based on the value of VLAN tag A and sends it through user-side port 732. The downstream packet is then transmitted to its destination, ONU 1, carrying LLID1. Also shown in FIG. 8 is an upstream packet with LLID2 from ONU 2. OLT 710 assigns VLAN tag B to the upstream packet based on LLID2 and sends it through network-side port 721.

Shared-VLAN Operation Mode of OLT

Figure 9:
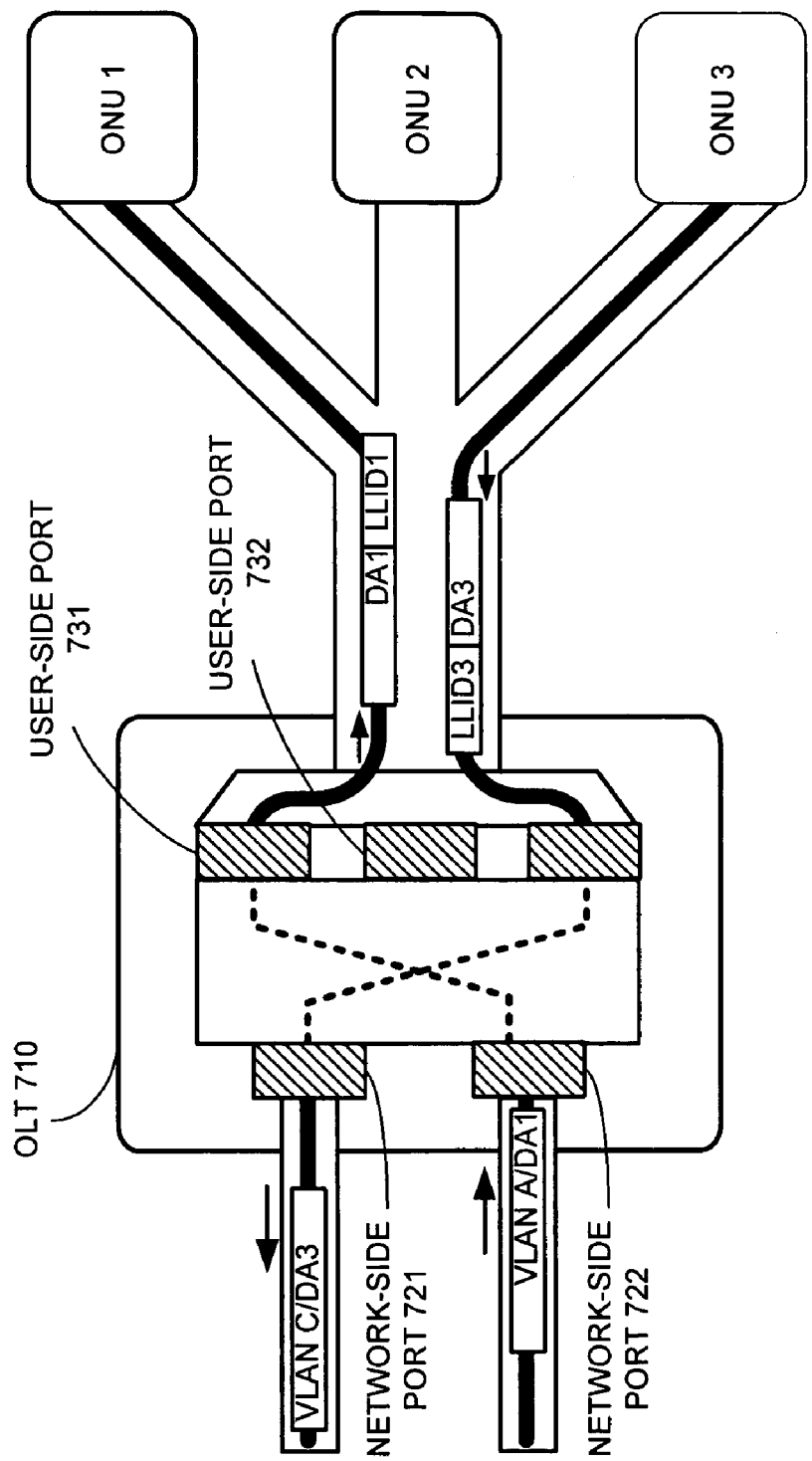
FIG. 9 illustrates shared-VLAN operation mode of an OLT in accordance with one embodiment of the present invention.

FIG. 9 illustrates shared-VLAN operation mode of an OLT in accordance with one embodiment of the present invention. In shared-VLAN mode, the virtual ONUs may form multiple broadcast domains. Each broadcast domain is associated with a VLAN tag, or, in other words, a group of LLIDs are associated with a VLAN tag. The shared-VLAN mode is useful when an EPON is served by multiple Internet service providers.

During operation, the OLT learns the source addresses of each forwarded packet. When a VLAN-tagged downstream packet arrives on a network-side port, the OLT first selects a group of user-side ports and corresponding LLIDs associated with the VLAN tag. The OLT then selects an individual user-side port and the corresponding LLID based on the MAC destination address of the downstream packet. The OLT may flood a packet with an unknown MAC destination address to all user-side ports within the given broadcast domain. The OLT may also discard an untagged packet arriving on a network-side port. Alternatively, the OLT may use the packet's MAC destination address to search for the correct LLID, as an OLT would do in a bridged operation mode.

In the upstream direction, the OLT adds a VLAN tag to a packet arriving on a user-side port based on the packet's LLID, wherein the VLAN tag is also associated with a group of LLIDs belonging to a broadcast domain. The OLT selects, based on the upstream packet's destination address, a particular network-side port which is within the same broadcast domain. If the OLT does not recognize the upstream packet's destination address, the OLT may flood the packet to all network-side ports within the broadcast domain.

In the example illustrated in FIG. 9, a downstream packet with VLAN tag A and destination address DA1 arrives on network-side port 722. OLT 710 subsequently determines that VLAN tag A corresponds to a broadcast domain comprising ONU 1 and ONU 2. OLT 710 also assigns the correct LLID (LLID 1 in this example) to the packet based on its destination address DA1. The downstream packet is then transmitted to its destination, ONU1, carrying LLID1. Also shown in FIG. 9 is an upstream packet with LLID 3 from ONU 3. OLT 710 assigns VLAN tag C to the upstream packet based on LLID3 and sends it through network-side port 721.

Transparent-VLAN Operation Mode

Figure 10:
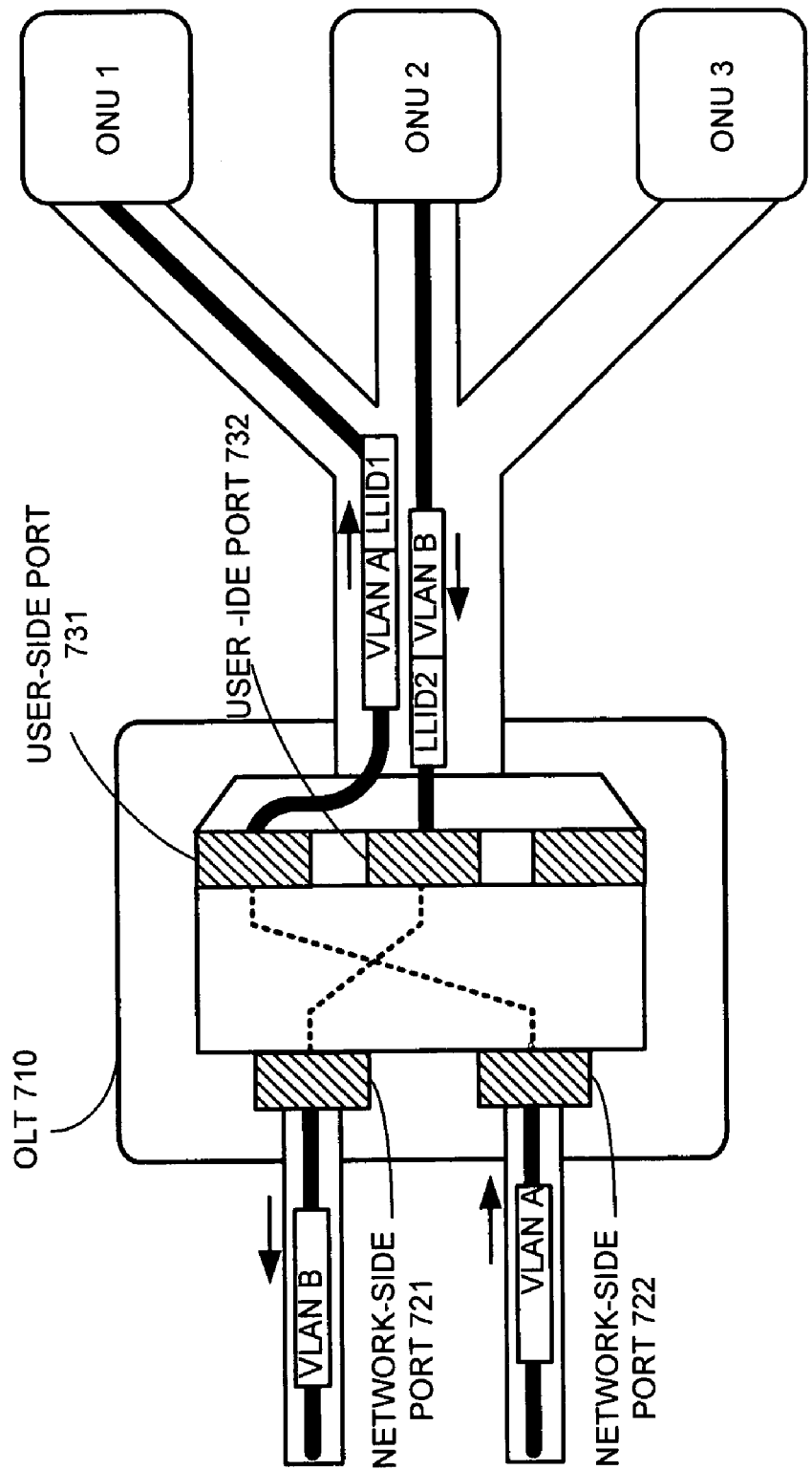
FIG. 10 illustrates transparent-VLAN operation mode of an OLT in accordance with one embodiment of the present invention.

FIG. 10 illustrates transparent-VLAN operation mode of an OLT in accordance with one embodiment of the present invention. In transparent-VLAN mode, an OLT preserves VLAN tags in forwarded packets. This mode is useful when a network operator directly provisions unique (network-significant) VLAN tags to the subscribers.

During operation, when a tagged downstream packet arrives on a network-side port, the OLT selects an individual user-side port and the corresponding LLID based on the downstream packet's VLAN tag. Note that in transparent-VLAN mode, the OLT does not remove the VLAN tag before transmitting the downstream packet to the destination ONU. The OLT may discard an untagged packet arriving on a network-side port. Alternatively, the OLT may use the packet's MAC destination address to search for the correct LLID, as an OLT would do in a bridged operation mode.

In the upstream direction, when a tagged upstream packet arrives on a user-side port, the OLT selects an individual network-side port based on the VLAN tag of the upstream packet. The OLT may discard an untagged upstream packet. Alternatively, the OLT may use the packet's MAC destination address to select the correct network-side port for forwarding the upstream packet.

In the example illustrated in FIG. 10, a downstream packet with VLAN tag A arrives on network-side port 722. OLT 710 subsequently assigns LLID1 to the downstream packet based on the value of VLAN tag A and sends it through user-side port 732. The downstream packet is then transmitted to its destination, ONU 1, carrying both VLAN tag A and LLID1. Also shown in FIG. 10 is an upstream packet with VLAN tag B and LLID2 from ONU 2. OLT 710 sends the upstream packet through network-side port 721 based on VLAN tag B, while preserving the VLAN tag in the upstream packet.

Translated-VLAN Operation Mode of OLT

Figure 11:
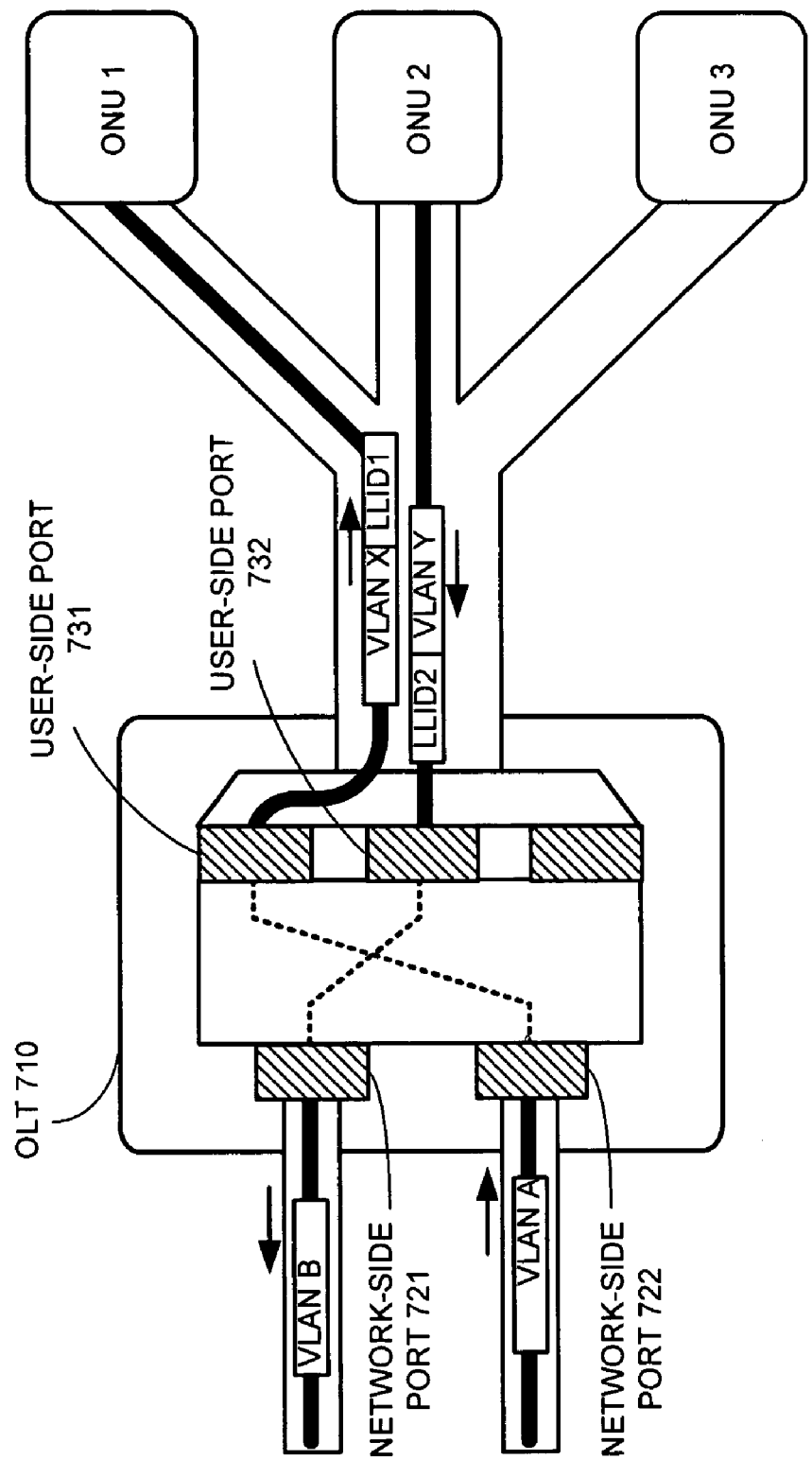
FIG. 11 illustrates translated-VLAN operation mode of an OLT in accordance with one embodiment of the present invention.

FIG. 11 illustrates translated-VLAN operation mode of an OLT in accordance with one embodiment of the present invention. Translated-VLAN mode is useful when the uniqueness of VLAN tags used by subscribers within an EPON cannot be guaranteed (e.g., when subscribers themselves select VLAN tag values). In translated-VLAN mode, the OLT translates an upstream packet's LLID and local-significant (usually non-unique) VLAN tag into a unique, network-significant VLAN tag. For a downstream packet, the OLT performs a reverse translation, where a unique network-significant VLAN tag is translated into a local-significant VLAN tag and an LLID.

During operation, when a tagged downstream packet arrives on a network-side port, the OLT selects an individual user-side port and the corresponding LLID based on the downstream packet's network-significant VLAN tag. The OLT also replaces the network-significant VLAN tag with a local-significant VLAN tag before transmitting the downstream packet to the destination ONU. The OLT may discard an untagged packet arriving on a network-side port. Alternatively, the OLT may use the packet's MAC destination address to search for the correct LLID, as an OLT would do in a bridged operation mode.

In the upstream direction, when a tagged upstream packet arrives on a user-side port, the OLT replaces the packet's local-significant VLAN tag with a network-significant VLAN tag, based on the packet's LLID and original local-significant VLAN tag. The OLT also selects an individual network-side port based on the network-significant VLAN tag. The OLT may discard an untagged upstream packet. Alternatively, the OLT may use the packet's MAC destination address to select the correct network-side port for forwarding the upstream packet.

In the example illustrated in FIG. 11, a downstream packet with network-significant VLAN tag A arrives on network-side port 722. OLT 710 subsequently assigns LLID1 to the downstream packet based on the value of VLAN tag A and replaces VLAN tag A with a local-significant VLAN tag X. OLT 710 then sends the packet through user-side port 732. The downstream packet is transmitted to its destination, ONU 1, carrying both VLAN tag X and LLID1. Also shown in FIG. 11 is an upstream packet with local-significant VLAN tag Y and LLID2 from ONU 2. OLT 710 replaces VLAN tag Y with network-significant VLAN tag B and sends the upstream packet through network-side port 721 based on VLAN tag B.

OLT and ONU Functioning as IGMP Proxies

Figure 12:
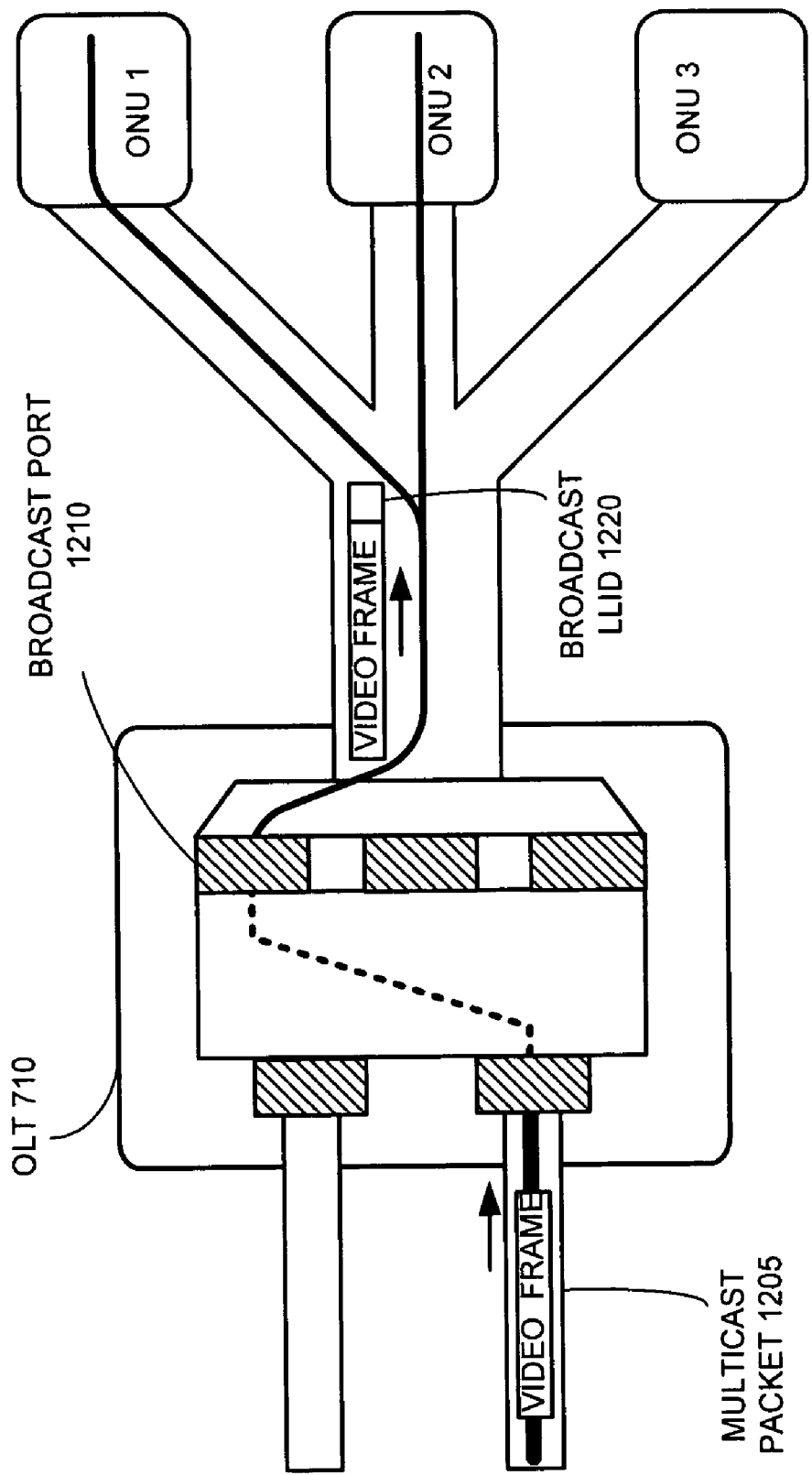
FIG. 12 illustrates an OLT functioning as an Internet Group Management Protocol (IGMP) proxy in accordance with one embodiment of the present invention.

FIG. 12 illustrates an OLT functioning as an Internet Group Management Protocol (IGMP) proxy in accordance with one embodiment of the present invention. In an EPON, multiple ONUs may join an IGMP multicast group to receive multicast data, such as video. Conventionally, each user joins a multicast group separately and receives an individual copy of the multicast data packet. This is inefficient because the EPON needs to deliver a separate copy of the packet to each member of the multicast group. One way to improve the efficiency and utilization of an EPON is to take advantage of it broadcast nature when delivering IGMP multicast packets.

One embodiment of the present invention allows an OLT to process and respond to IGMP messages sent by a user, thereby functioning as an IGMP proxy. The OLT communicates on behalf of all the members of a particular multicast group with the multicast source, and receives only one copy of the multicast data. After receiving a multicast data packet, the OLT broadcasts the multicast packet to all ONUs within the EPON. An ONU which is a member of the multicast group extracts the multicast packet and forwards it to the user.

Note that the OLT sends IGMP messages (such as "Join" and "Leave" messages) to the multicast source only when the OLT uplink status needs to change. For example, the OLT does not forward an IGMP "Join" message from an ONU to join an existing group, because the multicast group already exists within the EPON. The OLT only forwards an IGMP "Join" message from an ONU when that ONU is the first within the EPON to join a multicast group. Similarly, the OLT only forwards an IGMP "Leave" message from an ONU when that ONU is the last within the EPON to leave a multicast group.

To properly forward the IGMP messages from ONUs to the multicast source, and to properly join or leave an IGMP multicast group, an OLT can operate in a stateful mode or a stateless mode. In the stateful mode, the OLT maintains state information of every active multicast group, i.e., which ONU belongs to which active multicast group. In this way, the OLT can make proper decisions of whether to forward an ONU's IGMP "join" or "leave" message to the multicast source.

In the stateless mode, the OLT does not maintain full state information of all multicast groups. It only keeps track of which IGMP multicast groups are active, but does not maintain the knowledge of which ONUs belong to which multicast group. During operation, when an ONU sends a "join" request for the first time to join a new multicast group, the OLT forwards this "join" message to the multicast source because the OLT has no record of this new multicast group. When an ONU sends a "leave" request to leave an existing multicast group, the OLT broadcasts a confirmation request to every ONU within the EPON, asking the ONUs to confirm their membership of this multicast group. In this way, the OLT can determine whether the ONU requesting to leave is the last ONU in this multicast group; and if so, the OLT forwards the "leave" request to the multicast source.

In the example illustrated in FIG. 12, ONU 1, ONU 2, and ONU 3 are members of a multicast group. When multicast packet 1205 (a video frame) arrives at OLT 710, OLT 710 attaches broadcast LLID 1220 to the packet and sends it through broadcast port 1210. Multicast packet 1205 then reaches all the ONUs and each member of the multicast group may receive multicast packet 1205. Note that only one copy of multicast packet 1205 is sent by OLT 710.

Similarly, because an ONU generally can serve more than one user, an ONU can function like a multicast proxy like an OLT does. An ONU may process and respond to IGMP messages sent by a user. The ONU communicates on behalf of all the members (which are users served by this ONU) of a particular multicast group with the multicast source, and receives only one copy of the multicast data. After receiving a multicast data packet, the ONU determines whether any of its users belong to the corresponding multicast group, and if so, forwards the multicast packet to the appropriate users. In addition, like an OLT, an ONU can operate in a stateful mode or in a stateless mode.

ONU-Based Packet Classification

Figure 13:
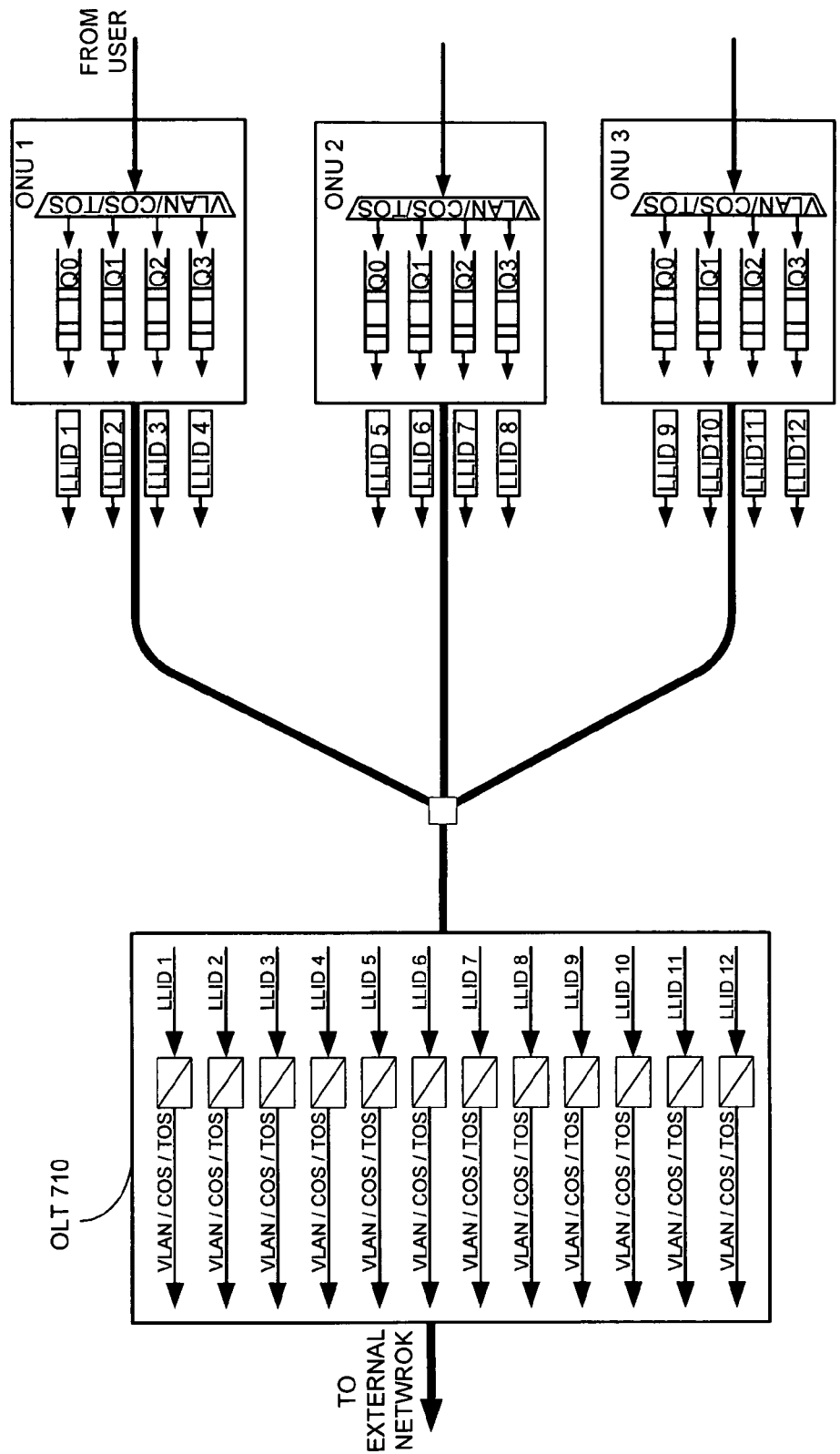
FIG. 13 illustrates ONU-based packet classification to facilitate enforcement of service-level agreements (SLAs) at the OLT in accordance of one embodiment of the present invention.

FIG. 13 illustrates ONU-based packet classification to facilitate enforcement of service-level agreements (SLAs) at the OLT in accordance of one embodiment of the present invention. To implement more flexible and diverse SLAs, an ONU can classify upstream packets, assign them different LLIDs, and can store them in different queues based on custom rules. In effect, there will be multiple virtual links between an ONU and the OLT, while each virtual link corresponds to an LLID which is associated with a specific service quality.

To assign appropriate service quality to upstream packets, an ONU can use custom rules. A custom rule includes the following three components: (1) a specific field to be used for traffic classification; (2) a range of values associated with the selected field(s); and (3) a queue where a packet satisfying the rule may be stored. A field can be identified by its position and length within a received packet, or by means of predefined encoding. For example, a filed can be located in a packet header by three parameters: layer, offset, and length. The layer parameter indicates at which header-level the system should start reading, e.g., MAC layer, IP layer, TCP/UDP layer, etc. This is because the header of a specific layer does not always have a consistent length, and hence specifying a field in a packet header by pointing at an absolute location does not always produce the correct result. The offset parameter and length parameter indicate the location of the field within the header of the specified layer.

For example, the following fields may be used for ingress packet classification at an ONU: IEEE 802.1p priority field, VLAN identifier, MAC destination address, Internet Protocol (IP) Type of Service (TOS) field, Multiple-Protocol Label Switching (MPLS) Class of Service (COS) field, IP source address, IP destination address, Transmission Control Protocol (TCP) or User Datagram Protocol (UDP) source port number, and TCP/UDP destination port number. Note that in practice an arbitrary combination of bits within a packet, including user payload, can be used for packet classification purposes.

The OLT may serve each packet carrying a different LLID with a corresponding SLA. Thus, packets classified and stored in different queues at an ONU will receive differentiated treatment at the OLT.

In the example illustrated in FIG. 13, each ONU has four queues, namely Q0, Q1, Q2, and Q3. Each queue corresponds to a unique LLID. When an upstream packet arrives from a user, an ONU classifies the packet according to its VLAN tag, COS field or TOS field, and stores the packet in the appropriate queue. Upon receiving an upstream packet, OLT 710 applies appropriate SLA policies based on the packet's LLID. The service that the upstream packet receives is hence in accordance with the SLA its sender has negotiated for.

In an alternative embodiment, the packets originating from the same ONU may be assigned the same LLID. Differentiated service qualities among packets with the same LLID can be attained by storing the packets in different queues based on certain packet-header fields, such as the TOS field. For example, an ONU may store packets with the same LLID in different queues corresponding to different service qualities according to the IEEE 802.1p Standards.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for forwarding packets in an Ethernet passive optical network (EPON) which includes a central node and at least one remote node, the method comprising:

assigning a logical link identifier (LLID) to a remote node, wherein an LLID corresponds to a logical link between the central node and a remote node;

associating an LLID with a port of a switch within the central node, wherein the switch has a number of ports;

wherein a port may be a physical port or a virtual port; and wherein the number of ports on the switch are divided into network-side ports and user-side ports;

receiving a downstream packet from a network-side port;

searching a mapping table to determine whether one or more field values of the downstream packet correspond to any LLIDs or ports;

if the one or more field values correspond to an LLID, assigning the LLID to the downstream packet and transmitting the downstream packet to a remote node;

maintaining knowledge at the central node of all active multicast groups within the EPON;

sending a message from the central node to a multicast source to join a multicast group if a remote node sends a message to join that multicast group of which no remote node is a member;

receiving a multicast packet at the central node on behalf of a number of remote nodes which are members of a multicast group; and broadcasting the multicast packet from the central node to every remote node, thereby eliminating the need for transmitting a separate copy of the multicast packet to each remote node which is a member of the multicast group.

2. The method of claim 1, wherein the one or more field values of the downstream packet include a media-access control (MAC) destination address; and wherein the method further comprises:

if the MAC destination address does not correspond to an LLID or a network-side port, flooding the downstream packet to all the user-side ports; and if the MAC destination address corresponds to a network-side port, dropping the downstream packet.

3. The method of claim 1, wherein the one or more field values of the downstream packet include a virtual local area network (VLAN) identifier.

4. The method of claim 3, further comprising dropping the downstream packet if the downstream packet does not carry a VLAN identifier which corresponds to an LLID or a port.

5. The method of claim 3, wherein if the downstream packet does not carry a VLAN identifier which corresponds to an LLID or a port, the method further comprises:

searching the mapping table to determine whether the MAC destination address of the downstream packet corresponds to an LLID or a port;

if the MAC destination address corresponds to an LLID, assigning the LLID to the downstream packet and transmitting the downstream packet to a remote node;

if the MAC destination address does not correspond to an LLID or a network-side port based on the mapping table, flooding the downstream packet to all the user-side ports; and if the MAC destination address of the downstream packet corresponds to a network-side port, dropping the downstream packet.

6. The method of claim 3, wherein if the VLAN identifier of the downstream packet corresponds to a group of LLIDs, the method further comprises:

searching the mapping table to determine whether the MAC destination address of the downstream packet corresponds to an LLID; and if the MAC destination address corresponds to an LLID which is among the group of LLIDs corresponding to the VLAN identifier, assigning the LLID to the downstream packet and transmitting the downstream packet to a remote node.

7. The method of claim 3, wherein assigning the LLID to the downstream packet involves tagging the downstream packet with the LLID while preserving the VLAN identifier of the downstream packet.

8. The method of claim 3, wherein if the VLAN identifier of the downstream packet corresponds to an LLID, the method further comprises replacing the VLAN identifier with a local-significant VLAN identifier prior to transmitting the downstream packet to a remote node.

9. The method of claim 1, further comprising:

receiving an upstream packet from a user-side port;

searching the mapping table to determine whether the MAC destination address of the upstream packet is associated with any network-side ports;

if the MAC destination address of the upstream packet corresponds to a network-side port, transmitting the upstream packet through that network-side port; and if the MAC destination address of the upstream packet does not correspond to a network-side port or a user-side port, flooding the upstream packet to all the network-side ports.

10. The method of claim 1, further comprising:

receiving an upstream packet from a user-side port;

searching the mapping table to determine whether the LLID of the upstream packet corresponds to a VLAN identifier; and if so, assigning the VLAN identifier to the upstream packet and transmitting the upstream packet through a corresponding network-side port.

11. The method of claim 10, wherein if the VLAN identifier also corresponds to a group of LLIDs and a number of network-side ports, the method further comprises:

searching the mapping table to determine whether the MAC destination address of the upstream packet corresponds to a network-side port which is among the number of network-side ports corresponding to the VLAN identifier; and if so, transmitting the upstream packet through that network-side port.

12. The method of claim 1, further comprising:

receiving an upstream packet from a user-side port;

if the upstream packet carries a VLAN identifier that corresponds to a network-side port, selecting the network-side port based on the VLAN identifier and transmitting the upstream packet through the network-side port.

13. The method of claim 12, further comprising dropping the upstream packet if the upstream packet does not carry a VLAN identifier that corresponds to a port.

14. The method of claim 12, wherein if the upstream packet does not carry a VLAN identifier which corresponds to a port, the method further comprises:

searching the mapping table to determine whether the MAC destination address corresponds to a network-side port; and if so, transmitting the upstream packet to that network-side port.

15. The method of claim 12, wherein if the upstream packet carries a VLAN identifier which corresponds to a network-side port, the method further comprises replacing the VLAN identifier of the upstream packet with a network-significant VLAN identifier.

16. The method of claim 1, further comprising:

maintaining knowledge at the central node of all the remote nodes which are members of any active multicast group; and if a remote node sends a message to leave that multicast group of which that remote node is the only member within the EPON, sending a message from the central node to a multicast source to leave a multicast group.

17. The method of claim 1, wherein if a remote node sends a message to the central node to leave a multicast group, the method further comprises:
broadcasting a query from the central node to all the remote nodes, thereby allowing the remote nodes to confirm membership for this multicast group; and
if the remote node that sends the leave message is the only member left in this multicast group within the EPON, sending a message from the central node to a multicast source to leave this multicast group.

18. The method of claim 1, further comprising:
maintaining knowledge at a remote node of all the active multicast groups to which the remote node belongs;
sending a message from the remote node to the central node to join a multicast group if a user sends a message to the remote node to join that multicast group of which no user coupled to the remote node is a member;
receiving a multicast packet at the remote node on behalf of a number of users which are members of the corresponding multicast group; and
forwarding the multicast packet from the remote node to the users which are coupled to the remote node and which are members of the corresponding multicast group.

19. The method of claim 18, further comprising:
maintaining knowledge at the remote node of all the users coupled to the remote node which are members of any active multicast group; and
if a user sends a message to the remote node to leave that multicast group of which that user is the only member coupled to the remote node, sending a message from the remote node to the central node to leave a multicast group.

20. The method of claim 18, wherein if a user sends a message to the remote node to leave a multicast group, the method further comprises:
broadcasting a query from the remote node to all the users coupled to the remote node, thereby allowing the users to confirm membership for this multicast group; and
if the user that sends the leave message is the only user which belongs to this multicast group and which is coupled to the remote node, sending a message from the remote node to the central node to leave this multicast group.

21. The method of claim 1, further comprising:
receiving an upstream packet from a user at a remote node;
detecting the values of one or more fields of the upstream packet;
buffering upstream packets in different queues based on the values of the one or more fields, thereby allowing different service qualities; and
transmitting the upstream packet to the central node.

22. The method of claim 21, wherein detecting the values of one or more fields of the upstream packet involves specifying a header layer, an offset, and a length of a field.

23. The method of claim 21, wherein the one or more fields are among: an IEEE 802.1p priority field, a VLAN identifier, a MAC destination address, an Internet Protocol (IP) Type of Service (TOS) field, a Multiple-Protocol Label Switching (MPLS) Class of Service (COS) field, an IP source address, an IP destination address, a Transmission Control Protocol (TCP) or User Datagram Protocol (UDP) source port number, and a TCP/UDP destination port number.

24. The method of claim 21, further comprising assigning an LLID to the upstream packet based on values of the one or more fields; and wherein buffering the upstream packets in different queues involves storing the packets in queues corresponding to the different LLIDs.

25. The method of claim 21, further comprising assigning an identical LLID to upstream packets whose values of the one or more fields differ; and wherein buffering the upstream packets in different queues involves storing the packets in queues based on the different values of the one or more fields.

26. An apparatus for forwarding packets in an Ethernet passive optical network (EPON), comprising a central node and at least one remote node; wherein the central node is configured to:
assign a logical link identifier (LLID) to a remote node, wherein an LLID corresponds to a logical link between the central node and a remote node,
associate an LLID with a port of a switch within the central node, wherein
the switch has a number of ports;
wherein a port may be a physical port or a virtual port; and
wherein the number of ports on the switch are divided into network-side ports and user-side ports;
receive a downstream packet from a network-side port;
search a mapping table to determine whether one or more field values of the downstream packet correspond to any LLIDs or ports;
if the one or more field values correspond to an LLID, to assign the LLID to the downstream packet and to transmit the downstream packet to a remote node;
maintain knowledge of all active multicast groups within the EPON;
send a message to a multicast source to join a multicast group if a remote node sends a message to join that multicast group of which no remote node is a member;
receive a multicast packet on behalf of a number of remote nodes which are members of a multicast group; and
to broadcast the multicast packet to every remote node, thereby eliminating the need for transmitting a separate copy of the multicast packet to each remote node which is a member of the multicast group.

27. The apparatus of claim 26, wherein the one or more field values of the downstream packet include a media-access control (MAC) destination address; and
wherein the central node is further configured to:
flood the downstream packet to all the user-side ports if the MAC destination address does not correspond to an LLID or a network-side port; and
to drop the downstream packet if the MAC destination address corresponds to a network-side port.

28. The apparatus of claim 26, wherein the one or more field values of the downstream packet include a virtual local area network (VLAN) identifier.

29. The apparatus of claim 28, wherein the central node is further configured to drop the downstream packet if the downstream packet does not carry a VLAN identifier which corresponds to an LLID or a port.

30. The apparatus of claim 28, wherein if the downstream packet does not carry a VLAN identifier which corresponds to an LLID or a port, the central node is configured to:

search the mapping table to determine whether the MAC destination address of the downstream packet corresponds to an LLID or a port;

if the MAC destination address corresponds to an LLID, assign the LLID to the downstream packet and transmit the downstream packet to a remote node;

if the MAC destination address does not correspond to an LLID or a network-side port based on the mapping table, flood the downstream packet to all the user-side ports; and if the MAC destination address of the downstream packet corresponds to a network-side port, drop the downstream packet.

31. The apparatus of claim 28, wherein if the VLAN identifier of the downstream packet corresponds to a group of LLIDs, the central node is further configured to:

search the mapping table to determine whether the MAC destination address of the downstream packet corresponds to an LLID; and if the MAC destination address corresponds to an LLID which is among the group of LLIDs corresponding to the VLAN identifier, assign the LLID to the downstream packet and transmit the downstream packet to a remote node.

32. The apparatus of claim 28, wherein while assigning the LLID to the downstream packet, the central node is configured to tag the downstream packet with the LLID while preserving the VLAN identifier of the downstream packet.

33. The apparatus of claim 28, wherein if the VLAN identifier of the downstream packet corresponds to an LLID, the central node is further configured to replace the VLAN identifier with a local-significant VLAN identifier prior to transmitting the downstream packet to a remote node.

34. The apparatus of claim 26, wherein the central node is further configured to:

receive an upstream packet from a user-side port;

search the mapping table to determine whether the MAC destination address of the upstream packet is associated with any network-side ports;

if the MAC destination address of the upstream packet corresponds to a network-side port, transmit the upstream packet through that network-side port; and if the MAC destination address of the upstream packet does not correspond to a network-side port or a user-side port, flood the upstream packet to all the network-side ports.

35. The apparatus of claim 26, wherein the central node is further configured to:

receive an upstream packet from a user-side port;

search the mapping table to determine whether the LLID of the upstream packet corresponds to a VLAN identifier; and if so, assign the VLAN identifier to the upstream packet and transmit the upstream packet through a corresponding network-side port.

36. The apparatus of claim 35, wherein if the VLAN identifier also corresponds to a group of LLIDs and a number of network-side ports, the central node is configured to:

search the mapping table to determine whether the MAC destination address of the upstream packet corresponds to a network-side port which is among the number of network-side ports corresponding to the VLAN identifier; and if so, transmit the upstream packet through that network-side port.

37. The apparatus of claim 26, wherein the central node is further configured to:

receive an upstream packet from a user-side port;

if the upstream packet carries a VLAN identifier that corresponds to a network-side port, select the network-side port based on the VLAN identifier and transmit the upstream packet through the network-side port.

38. The apparatus of claim 37, wherein the central node is further configured to drop the upstream packet if the upstream packet does not carry a VLAN identifier that corresponds to a port.

39. The apparatus of claim 37, wherein if the upstream packet does not carry a VLAN identifier which corresponds to a port, the central node is configured to:

search the mapping table to determine whether the MAC destination address corresponds to a network-side port; and if so, transmit the upstream packet to that network-side port.

40. The apparatus of claim 37, wherein if the upstream packet carries a VLAN identifier which corresponds to a network-side port, the central node is configured to replace the VLAN identifier of the upstream packet with a network-significant VLAN identifier.

41. The apparatus of claim 26, wherein the central node is further configured to:

maintain knowledge of all the remote nodes which are members of any active multicast group; and if a remote node sends a message to leave that multicast group of which that remote node is the only member within the EPON, to send a message to a multicast source to leave a multicast group.

42. The apparatus of claim 26, wherein if a remote node sends a message to the central node to leave a multicast group, the central node is further configured to:

broadcast a query to all the remote nodes, thereby allowing the remote nodes to confirm membership for this multicast group; and if the remote node that sends the leave message is the only member left in this multicast group within the EPON, to send a message to a multicast source to leave this multicast group.

43. The apparatus of claim 26, wherein a remote node is configured to:

maintain knowledge of all the active multicast groups to which the remote node belongs;

send a message to the central node to join a multicast group if a user sends a message to the remote node to join that multicast group of which no user coupled to the remote node is a member;

receive a multicast packet on behalf of a number of users which are members of the corresponding multicast group; and to forward the multicast packet to the users which are coupled to the remote node and which are members of the corresponding multicast group.

44. The apparatus of claim 43, wherein the remote node is further configured to:

maintain knowledge of all the users coupled to the remote node which are members of any active multicast group; and if a user sends a message to the remote node to leave that multicast group of which that user is the only member coupled to the remote node, to send a message to the central node to leave a multicast group.

45. The apparatus of claim 43, wherein if a user sends a message to the remote node to leave a multicast group, the remote node is further configured to:

broadcast a query to all the users coupled to the remote node, thereby allowing the users to confirm membership for this multicast group; and if the user that sends the leave message is the only user which belongs to this multicast group and which is coupled to the remote node, to send a message from the remote node to the central node to leave this multicast group.

46. The apparatus of claim 26, wherein a remote node is configured to:

receive an upstream packet from a user;

detect the values of one or more fields of the upstream packet;

buffer upstream packets in different queues based on the values of the one or more fields, thereby allowing different service qualities; and to transmit the upstream packet to the central node.

47. The apparatus of claim 46, wherein in detecting the values of one or more fields of the upstream packet, the remote node is configured to specify a header layer, an offset, and a length of a field.

48. The apparatus of claim 46, wherein the one or more fields are among: an IEEE 802.1p priority field, a VLAN identifier, a MAC destination address, an Internet Protocol (IP) Type of Service (TOS) field, a Multiple-Protocol Label Switching (MPLS) Class of Service (COS) field, an IP source address, an IP destination address, a Transmission Control Protocol (TCP) or User Datagram Protocol (UDP) source port number, and a TCP/UDP destination port number.

49. The apparatus of claim 46, wherein the remote node is further configured to assign an LLID to the upstream packet based on values of the one or more fields; and wherein while buffering the upstream packets in different queues, the remote node is configured to store the packets in queues corresponding to the different LLIDs.

50. The apparatus of claim 46, wherein the remote node is further configured to assign an identical LLID to upstream packets whose values of the one or more fields differ; and wherein while buffering the upstream packets in different queues, the remote node is configured to store the packets in queues based on the different values of the one or more fields.

* * * * *